(12) United States Patent
Nishikawa et al.

(10) Patent No.: US 7,368,058 B2
(45) Date of Patent: May 6, 2008

(54) METHOD OF GENERATING FRESH WATER AND FRESH-WATER GENERATOR

(75) Inventors: Tsuyoshi Nishikawa, Kyoto (JP); Masahiro Kihara, Shiga (JP); Tamotsu Kitade, Hyogo (JP); Wataru Sugiura, Saitama (JP)

(73) Assignee: Toray Industries, Inc., Tokyo (JP)

( * ) Notice: Subject to any disclaimer, the term of this patent is extended or adjusted under 35 U.S.C. 154(b) by 254 days.

(21) Appl. No.: 10/473,251

(22) PCT Filed: Jan. 20, 2003

(86) PCT No.: PCT/JP03/00406

§ 371 (c)(1),
(2), (4) Date: Sep. 29, 2003

(87) PCT Pub. No.: WO03/062151

PCT Pub. Date: Jul. 31, 2003

(65) Prior Publication Data

US 2004/0099600 A1    May 27, 2004

(30) Foreign Application Priority Data

Jan. 22, 2002  (JP)  ............................. 2002-012587
Apr. 26, 2002  (JP)  ............................. 2002-126062

(51) Int. Cl.
*B01D 61/00* (2006.01)
*B01D 15/00* (2006.01)
*B01D 63/00* (2006.01)

(52) U.S. Cl. ...................... 210/652; 210/651; 210/639; 210/660; 210/663

(58) Field of Classification Search ................ 210/652, 210/195.2, 257.2, 134, 651, 654, 638, 639, 210/197.2, 660
See application file for complete search history.

(56) References Cited

U.S. PATENT DOCUMENTS 5,250,185 A * 10/1993 Tao et al. .................... 210/654
5,833,846 A    11/1998 Tanabe et al.

(Continued)

FOREIGN PATENT DOCUMENTS

JP    09-10766    1/1997

(Continued)

OTHER PUBLICATIONS

M. Rodriguez Pastor et al, Influence of pH in eleimination of boron by means of reverse osmosis, Desalination 140(2001) 145-152).*

(Continued)

*Primary Examiner*—Ana Fortuna
(74) *Attorney, Agent, or Firm*—Birch, Stewart, Kolasch & Birch, LLP

(57) ABSTRACT

The present invention is a water processing method comprising the steps of separating boron-containing water in a reverse osmosis membrane module to provide a permeated water and subjecting a part of the obtained permeated water to boron removal using an adsorbent, wherein the water subjected to the boron removal is mixed with the water not subjected to the boron removal of the permeated water to provide a mixed water. The present invention provides economic water processing method and apparatus that remove the boron from boron-containing water.

4 Claims, 8 Drawing Sheets

U.S. PATENT DOCUMENTS

| | | | |
|---|---|---|---|
| 5,925,255 A | | 7/1999 | Mukhopadhyay |
| 6,054,050 A | * | 4/2000 | Dyke .......................... 210/639 |
| 6,120,689 A | * | 9/2000 | Tonelli et al. .............. 210/652 |
| 6,171,497 B1 | * | 1/2001 | Hirose et al. .......... 210/500.38 |
| 6,267,891 B1 | * | 7/2001 | Tonelli et al. .............. 210/652 |
| 6,509,936 B1 | * | 1/2003 | Brennesholtz .............. 348/626 |
| 6,645,383 B1 | * | 11/2003 | Lee et al. ................... 210/652 |
| 6,805,796 B2 | * | 10/2004 | Hirose et al. .......... 210/321.76 |
| 6,821,430 B2 | * | 11/2004 | Andou et al. ............... 210/636 |

FOREIGN PATENT DOCUMENTS

| | | |
|---|---|---|
| JP | 10-015356 A | 1/1998 |
| JP | 10-085743 A | 4/1998 |
| JP | 11-10146 A | 1/1999 |
| JP | 2000-288544 A | 10/2000 |
| JP | 2000-354865 A | 12/2000 |
| JP | 2001-269543 A | 10/2001 |
| WO | WO 03/039708 A1 | 5/2003 |

OTHER PUBLICATIONS

D. Pratts et al, Analysis of the influence of pH and pressure on the elimination of boron in reverse osmosis, Desalination 128 (200) 269-273.*

Magara et al, development of boron reduction system for sea water desalination, Desalination 118 (1998) 25-33.*

Nissim Nadav; Desalination; vol. 124, No. 1-3; Nov. 1, 1999; pp. 131-135; XP004311633.

Derwent Publications Ltd.; Database WPI; Section Ch; Week 200212; XP002310508.

Derwent Publications Ltd.; Database WPI; Section Ch; Week 199913; XP002310509.

P. Glueckstern et al.; Water Science and Technology: Water Supply; vol. 3, No. 5-6; pp. 39-47; 2003; XP008040290.

Chinese Office Action No. CN 1231938A dated Oct. 20, 1999.

* cited by examiner

METHOD OF GENERATING FRESH WATER AND FRESH-WATER GENERATOR

This application is the national phase under 35 U.S.C. § 371 of PCT International Application No. PCT/JP03/00406 which has an International filing date of Jan. 20, 2003, which designated the United States of America.

TECHNICAL FIELD

The present invention relates to a water processing apparatus comprising a reverse osmosis membrane module and a boron removal means, and to a water processing method using the apparatus.

BACKGROUND ART

For the production of fresh water from seawater or brackish water and the production of clean water from a river and a lake, a water processing apparatus with a reverse osmosis membrane module is used. In this types of the water processing apparatus, basically raw water (seawater or the like) that is preprocessed, i.e., sterilization, turbid components removal and the like, is provided to a reverse osmosis membrane module 2 after a pressure of the raw water is increased to the predetermined value (for example, about 6.0 MPa) with a high pressure pump 1, and then is separated into a permeated water (fresh water) and a concentrated water by reverse osmosis, as shown in FIG. 1. The obtained permeated water has water quality that substantially satisfies a value defined by the WHO water quality guideline, except for boron.

The boron is present in the seawater as boric acid in a concentration of about 4 to 5 mg/L. With presently commercially available reverse osmosis membrane modules for seawater desalination, depending on the conditions, it may be difficult to keep a boron concentration at an interim value (0.5 mg/L) or less defined by the WHO water quality guideline.

Japanese Unexamined Patent Application Publication No. 9-10766 discloses a water processing method for providing seawater to a first reverse osmosis membrane module, adjusting a pH of a permeated water to 5.7 or more, and then providing the permeated water to a second reverse osmosis membrane module.

However, in the reverse osmosis membrane method, there is no choice but to discharge the concentrated water after the separation. Therefore, the amount of the permeated water obtained based on a feed water, i.e., so-called production efficiency, is limited. It is required to process water extra, about 10% or more, in the first reverse osmosis membrane module compared with the case no second reverse osmosis membrane module, that is, the boron remained in the permeated water is not removed. Thus, it increases costs of equipment and electric power, which is not economical.

On the other hand, instead of the reverse osmosis membrane method, examples of the method for removing boron include an adsorption removal method using a strong base anion exchange resin, or an adsorption removal method using a resin comprising styrene-divinylbenzene copolymer combined with N-methyl glucamine. Japanese Unexamined Patent Application Publication No. 10-15356 discloses a water processing method that a permeated water in a reverse osmosis membrane module is flowed through an ion exchange resin layer to remove boron. In this case, the ion exchange resin layer can have a water processing efficiency of 96% or more, which is effective. However, it costs high in equipment such as an adsorption tower, initial investment of the resin, and recycling of the resin. There is a problem in terms of economic.

DISCLOSURE OF INVENTION

An object of the present invention provides an economic water processing method and apparatus for removing boron from boron-containing water.

The present invention is a water processing method comprising the steps of separating boron-containing water in a reverse osmosis membrane module to provide a permeated water and subjecting a part of the obtained permeated water to boron removal using an adsorbent, wherein the water subjected to the boron removal is mixed with the water not subjected to the boron removal of the permeated water to provide a mixed water.

Also, the present invention is a water processing apparatus, comprising a water booster, a reverse osmosis membrane module for separating boosted water into a concentrated water and a permeated water, a boron removal means for removing boron from the water processed in the reverse osmosis membrane module, a watercourse for water not passing through the boron removal means, a mixing means for mixing water passing through the boron removal means with the water not passing through the boron removal means. The water processed in the reverse osmosis membrane module herein means water in which a solute such as salinity is removed by the reverse osmosis membrane module.

BEST MODE FOR CARRYING OUT THE INVENTION

Referring to Figures, the water processing method and apparatus of the present invention will be described below.

Figure 1:
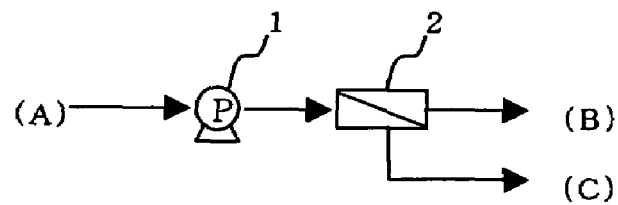
FIG. 1 is a principal schematic diagram of a conventional water processing apparatus.
Figure 2:
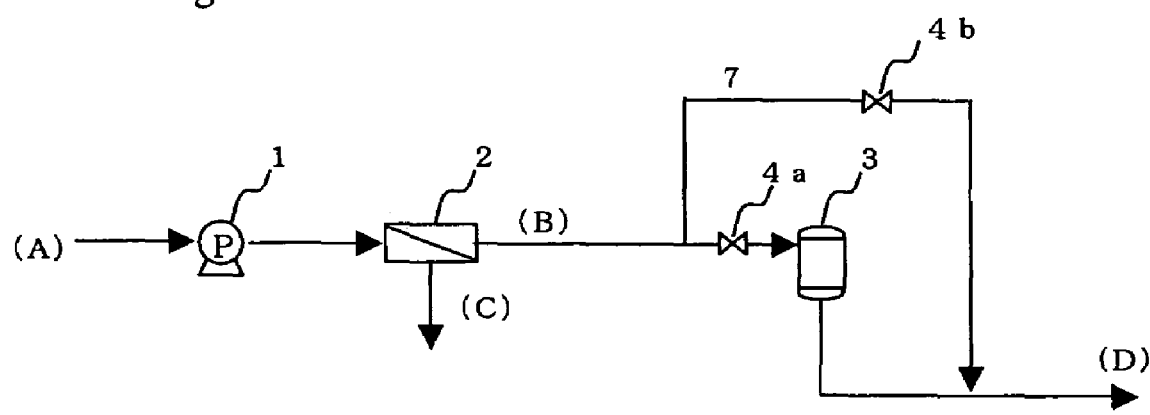
FIGS. 2 to 14, and 17 to 20 show principal schematic diagrams of water processing apparatuses according to one embodiment of the present invention.

FIG. 2 is a principal schematic diagram of the water processing apparatus according to one embodiment of the present invention.

As shown in FIG. 2, the water processing apparatus of the present invention comprises a reverse osmosis membrane module 2. Also, at an upstream side on the reverse osmosis membrane module 2, the apparatus comprises the high pressure pump 1 (booster) for boosting the water to provide it to the reverse osmosis membrane module 2. At the reverse osmosis membrane module 2, a feed water (A) boosted is separated into a concentrated water (C) and a permeated water (B). At a downstream side on the reverse osmosis membrane module 2, there is provided a boron removal means 3 for removing boron from water, and a bypass line 7 in parallel therewith as a watercourse not passing through the boron removal means 3. At the upstream side on the reverse osmosis membrane module 2, it is preferable that a flow control valve 4a be provided. Also, a flow control valve 4b is preferably provided at the bypass line 7.

At downstream sides of the boron removal means 3 and the bypass line 7, there is provided a mixing means for mixing water passing through the boron removal means with water not passing through the boron removal means. The mixing means herein may simply merge the watercourse of the water passed through the boron removal means with the watercourse of the water not passed through the boron removal means. At the merge point of the watercourses, or the downstream sides thereof, a tank (not shown) may be optionally provided. When the tank is not provided, it is advantageous in terms of a setup space. On the other hand, when the tank is provided, it is advantageous in that quality of the mixed water is easily kept uniform. By the mixing means, the water subjected to the boron removal and the water not subjected to the boron removal in the permeated water (B) are mixed to provide a mixed water (D).

As the boron removal means 3, the means for removing boron with an adsorbent can be used. There is another method for removing boron by alkali aggregation precipitation using an aluminum salt and slaked lime. This method is suitable for high boron concentration. However, it may result in high costs, when a great amount of a dilute solution is used. Accordingly, when the seawater or the like is processed, the adsorbent is preferably used for removing. Examples of the adsorbent include an inorganic adsorbent, an ion exchange resin, a chelate resin, etc. The chelate resin is preferable, since it has very high selectivity to the boron.

In the present invention, the reverse osmosis membrane for use in the reverse osmosis membrane module 2 is a semipermeable membrane that permeates a component of the feed water, i.e., water, but does not permeate other components. Materials of the reverse osmosis membrane are often polymer materials such as cellulose acetate based polymers, polyamides, polyesters, polyimides and vinyl polymers. The membrane may have an asymmetric structure that a dense layer is disposed on at least one surface of the membrane and micropores are disposed therein such that their diameters are gradually increased from the dense layer to an inside of the membrane or the other side of the membrane. Also, the membrane may have a composite structure that a very thin separating functional layer is formed on the asymmetric structure. The separating functional layer is made of different material from that of the asymmetric structure. The membrane may be a form of hollow yarns or a flat membrane. The present invention can be implemented effectively using any membrane materials, membrane structures and membrane forms. Representative membranes include the asymmetric membrane made of cellulose acetate and polyamides, and the composite membrane having the separating functional layer made of the polyamides or polyurea. In view of the water processing amount, durability and salt rejection, the cellulose acetate based asymmetric membrane or the polyamide based composite membrane is preferably used.

Such membrane is incorporated into an element such as spiral, tubular, plate and frame, or the hollow yarn membrane is bundled and then incorporated into the element for actual use. However, the present invention is not dependent upon the forms of the membrane elements.

In the reverse osmosis membrane module, one to several membrane elements described above are contained in a pressure vessel. A plurality of the modules may be used such that the modules are disposed in parallel. Any combinations, numbers and positioning of the modules can be used depending on the intended purposes.

Then, a water flow in the water processing apparatus will be described when the seawater is used as the raw water. The seawater (raw water) that is preprocessed, i.e., sterilzation, removal of turbid components is boosted with the high pressure pump, and fed into the reverse osmosis membrane module 2. The fed seawater is separated into a permeated water in which a solute such as salt is removed and a concentrated water in which a solute such as a salt is concentrated, and the concentrated water is discharged from an outlet.

The permeated water (fresh water) obtained in the reverse osmosis membrane module 2 is divided into a water that flows into the boron removal means 3 and a water that passes through the bypass line 7. The boron contained in the water flowing into the boron removal means 3 is removed by the adsorbent. The water is then mixed with the water passing through the bypass line 7 at a confluence of the watercourse. Thus, the mixed water having the desired boron concentration is obtained.

The apparatus may preferably comprise a controlling means (not shown) for controlling a flow ratio of the water passing through the boron removal means 3 to the water passing through the bypass line 7. It is preferable that the flow ratio of the water subjected to the boron removal to the water not subjected to the boron removal be controlled to provide the mixed water having the desired water quality. The controlling means preferably include a water permeate flow sensor (not shown) and a boron concentration sensor (not shown). For example, the water permeate flow sensor and the boron concentration sensor are disposed between the reverse osmosis membrane module 2 and a branch point of the boron removal means 3 and the bypass line 7. In addition, the boron concentration sensor is also disposed at a downstream of a confluence of the water passed through the boron removal means 3 and the bypass line. Based on the boron concentration of the permeated water in the reverse osmosis membrane module 2, the boron concentration of the mixed water, and the amount of the permeated water obtained in the reverse osmosis membrane module 2, the water flow ratio of the water for flowing into the boron removal means 3 to the water for passing through the bypass line is determined and adjusted.

Specifically, the water permeate flow measured by the water permeate flow sensor disposed on the permeated water side of the reverse osmosis membrane module 2, the boron concentration in the permeated water measured by the boron concentration sensor, and the boron concentration in the mixed water passed through the bypass line and the boron removal means 3 are, as information showing operational status of the water processing apparatus, inputted into an adjusting means. The adjusting means is constructed so as to adjust the flow control valve 4a and the flow control valve 4b, in accordance with these measurement information. The adjusting means comprises a part for controlling the quality of the permeated water, a part for controlling the amount of the permeated water, a part for controlling the amount of the bypass and the like.

In other words, if the water quality of the permeated water obtained in the reverse osmosis membrane module 2 is low, i.e., if the boron concentration of the permeated water exceeds 0.5 mg/L which is the defined value by the WHO water quality guide line, the flow control valves 4a and 4b are controlled so that a part of the permeated water flows into the born removal means 3 and the remaining flows into the bypass line 7. A percentage of the water flowing into the bypass line 7 is controlled so that the boron concentration of the mixed water becomes 0.5 mg/L or less. If the water quality of the permeated water obtained in the reverse osmosis membrane module 2 is high, i.e., if the boron concentration of the permeated water is not more than 0.5 mg/L, the flow control valve 4a is closed and the flow control valve 4b is fully open so that the total amount of the permeated water flows through the bypass line 7 and not through the boron removal means 3.

Thus, there can be obtained the processed water with a stable boron concentration by controlling the flow ratio of the permeated water passing through the boron removal means to the permeated water passing through the bypass means in reply to the water quality, even if the raw water is the seawater having the water quality being changed depending on the temperature change. Also, the boron removal means can be utilized more effectively, resulting in improved economical properties. The flow ratio may be adjusted by a time shared control that controls a time to open or close the flow control valves 4a, 4b.

As described above, according to the present invention, potable quality water having less boron can be obtained from the raw water having the boron concentration of 3 mg/L or more such as the seawater and brackish water. Also, the boron removal means can be utilized efficiently, and the costs of the equipment and the operations can be decreased, which leads to improved economic properties.

By using the adsorbent that selectively adsorbs the boron, only the boron is removed from the water and no minerals is not removed therefrom. Accordingly, palatable water containing reasonable minerals can be provided.

Figure 3:
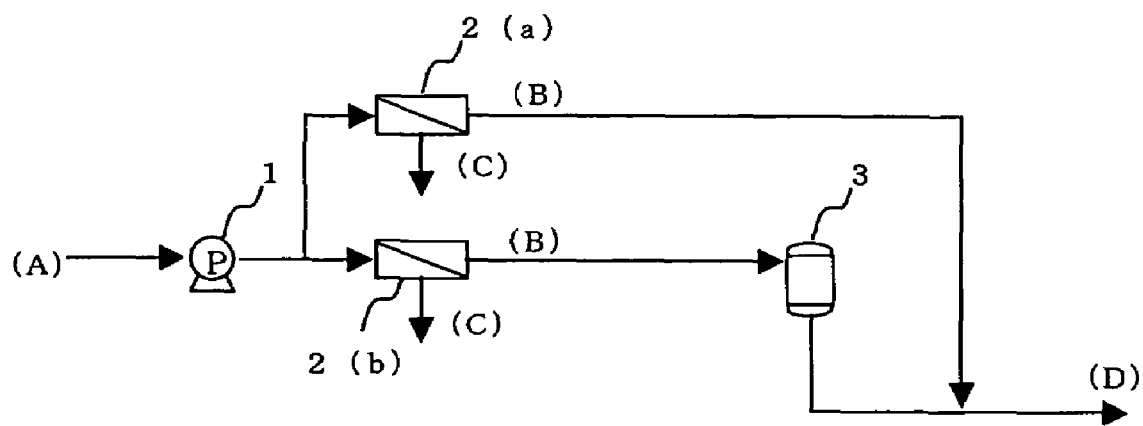

FIG. 3 shows a principal schematic diagram of the water processing apparatus according to another embodiment of the present invention. In this embodiment, the reverse osmosis membrane-module 2 comprises a plurality of reverse osmosis membrane modules 2(a), 2(b). The permeated water side on the reverse osmosis membrane module 2(b) is connected to the boron removal means 3. On the other hand, the permeated water side on the reverse osmosis membrane module 2(a) is connected to the watercourse which does not have the boron removal means 3 and is merged with the water course from the boron removal means 3.

Figure 4:
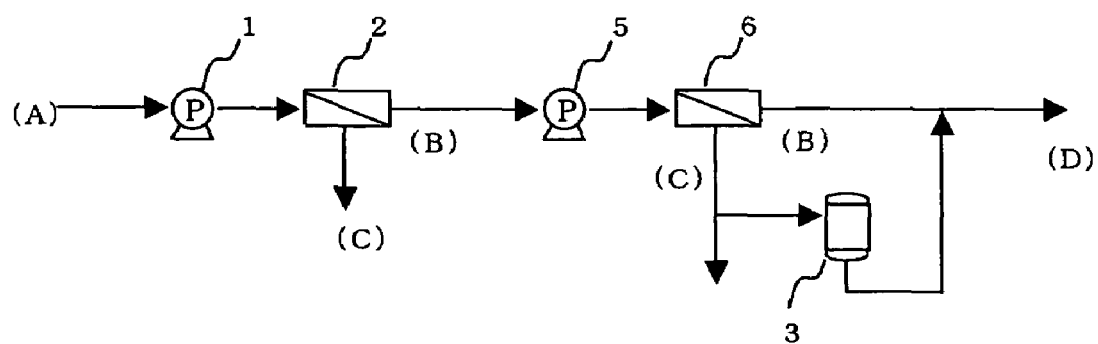

FIG. 4 shows a principal schematic diagram of the water processing apparatus according to another embodiment of the present invention. In this embodiment, the reverse osmosis membrane module 2 is the first reverse osmosis membrane module, and the second osmosis membrane module 6 is disposed at a downstream of the permeated water side thereof. In this case, a low pressure pump 5 (booster) is disposed between the first reverse osmosis membrane module 2 and the second osmosis membrane module 6. The water boosted by the low pressure pump 5 is further separated into the concentrated water and the permeated water at the second osmosis membrane module 6.

At the downstream of the concentrated water side on the second osmosis membrane module 6, the boron removal means 3 is disposed. At least a part of the concentrated water is introduced into the boron removal means 3 to remove the boron. The total amount of the concentrated water may be introduced into the boron removal means 3. There is disposed a line and the like where the concentrated water including no boron from the second osmosis membrane module 6 is merged with the permeated water in the second osmosis membrane module 6. By using the line, the water not passed through the boron removal means 3 is mixed with the water passed through the boron removal means 3.

It is also preferable that an alkali injection means (not shown) for adjusting the pH of the water be disposed between the first osmosis membrane module 2 and the second osmosis membrane module 6. Any of the alkali injection means and the low pressure pump (booster) may be disposed at the upstream side. It is not preferable that the alkali injection means be disposed at the upstream of the first osmosis membrane module 2, since scales are easily produced by injecting alkali into the water having high ion concentration.

The seawater that is boosted with the high pressure pump 1 and fed into the first osmosis membrane module 2 is separated into the permeated water in which the solute such as a salt is removed and the concentrated water in which the solute such as a salt is concentrated. The concentrated water is discharged from the outlet. Thereafter, the permeated water (fresh water) obtained in the first osmosis membrane module 2 is adjusted for pH such that boric acid contained in the water is dissociated to be anions by the alkali injection means. Boric acid has a dissociation constant pKa of 9, and is almost not dissociated in the seawater. However, the composite reverse osmosis membrane having a cross-linked wholly aromatic polyamide separating functional layer that is a typical osmosis membrane has a property that excludes more ionic substances than neutral substances. It is therefore preferable that the pH be adjusted to 9 or more. The pH is more preferably 9.5 or more and 11 or less. As the alkali, a strong solution of an alkali salt such as sodium hydroxide and sodium carbonate is used, and is preferably injected with a chemical feed pump.

The permeated water from the first reverse osmosis membrane module 2 having the adjusted pH suitable for the boron removal is boosted with the low pressure pump 5, is fed to the second reverse osmosis membrane module 6, and is further separated into the permeated water in which the boron and the like are removed and the concentrated water in which the boron and the like are concentrated.

At least a part of the concentrated water of the reverse osmosis membrane module 6 is sent to the boron removal means where the boron is removed, and is mixed with the permeated water from the second reverse osmosis membrane module 6.

In this embodiment, the water having the adjusted pH suitable for the boron removal is processed at the second reverse osmosis membrane module 6. For example, at the permeated water side, the water is obtained in a ratio of about 90% of the feed water which is including less boron, and at the concentrated water side, the water is obtained in a ratio of about as small as 10% of the feed water in which the boron is concentrated. Only the small amount of the concentrated water is processed by the boron removal means utilizing the adsorbent. Accordingly, the boron can be removed efficiently and economically. The water including no boron is mixed with the permeated water from the reverse osmosis membrane module 6 to improve water processing efficiency. For example, the water processing efficiency in the boron removal step can be as high as 99% or more. In the boron removal by the conventionally known reverse osmosis membrane method, the concentrated water is discharged. Consequently, it is difficult to provide 90% or more of water processing efficiency.

In the boron removal by the conventionally known reverse osmosis membrane method, minerals such as calcium and magnesium contained in the water are discharged together with the concentrated water, resulting in unpalatable potable quality water. In the water processing apparatus of the present embodiment, the adsorbent for selectively adsorbing the boron is used, only the boron is removed from the concentrated water of the reverse osmosis membrane module 6 and no minerals are removed therefrom. The water is mixed with the permeated water, whereby the calcium and magnesium that have been removed in the reverse osmosis membrane module 6 are returned back to the permeated water. There can be obtained the palatable water adequately containing minerals.

In this embodiment, the membrane used in the first reverse osmosis membrane module 2 preferably has salt rejection of 90% or more when a saline solution having a concentration of 35,700 mg/L at 25° C. and pH 6.5 is fed at 5.5 MPa. The higher the salt rejection is, the lower the chlorine concentration in the permeated water is. The membrane has separation properties such that the membrane has more preferably the salt rejection of 95% or more, most preferably 99% or more. If the membrane has the salt rejection of less than 90%, the amount of the chlorine ions in the permeated water increases, and it is difficult to use the permeated water directly as the potable water or industrial water.

In the present invention, the membrane used in the reverse osmosis membrane module 6 preferably has flux of 0.8 $m^3/m^2 \cdot day$ or more when a saline solution having a concentration of 1500 mg/L at 25° C. and pH 6.5 is fed at 1.5 MPa. In order to provide higher flow per unit element, the flux is more preferably 1.0 $m^3/m^2 \cdot day$ or more. The membrane preferably separation properties such that the membrane has salt rejection of 90% or more, more preferably 98% or more, when a saline solution having a concentration of 1500 mg/L at 25° C. and pH 6.5 is fed at 1.5 MPa, and salt rejection of 90% or more, more preferably 98% or more, when a magnesium sulfate solution having a concentration of 1500 mg/L at 25° C. and pH 6.5 is fed at 1.5 MPa.

In the present invention, when plural reverse osmosis membrane modules are disposed, any configurations may be used as long as the water passing through the boron removal means and the water not passing through the boron removal means are mixed. The modules may be in multi-stages, i.e., three, four or more stages. Various embodiments are shown in FIGS. 5 to 14.

Figure 5:
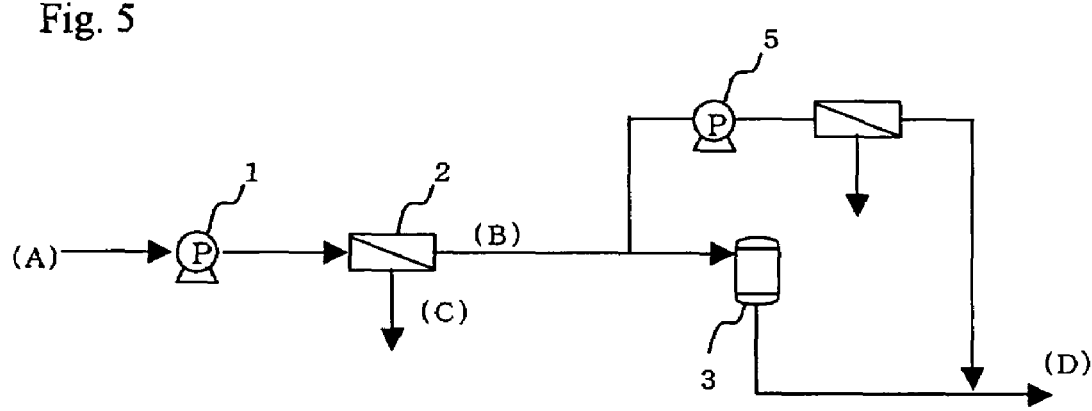
Figure 6:
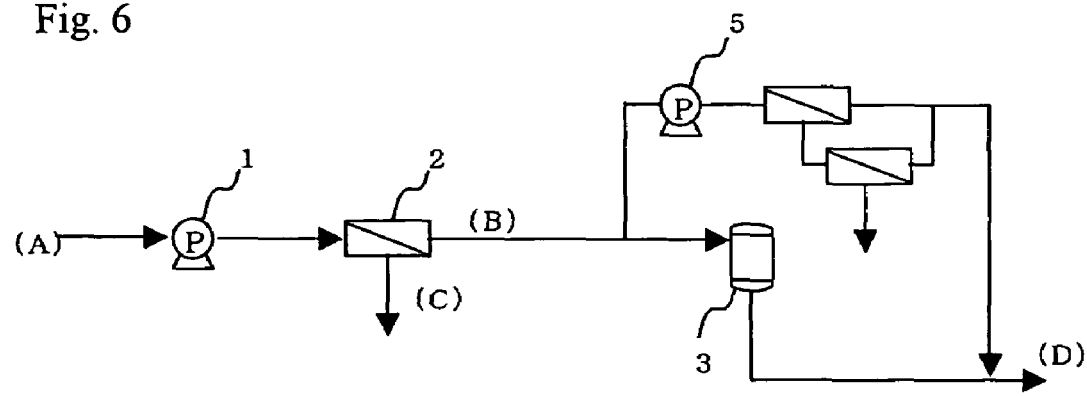
Figure 7:
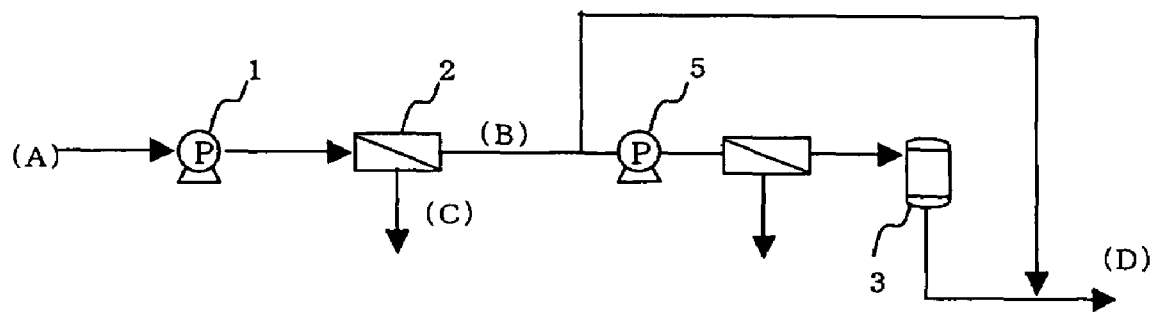
Figure 8:
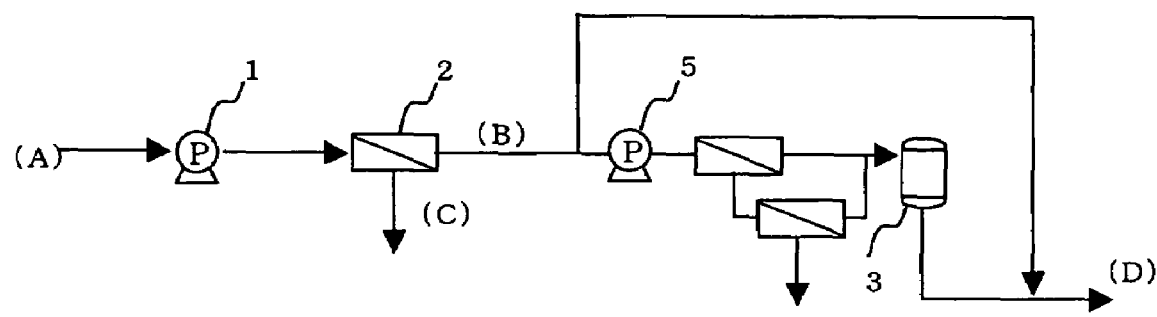
Figure 9:
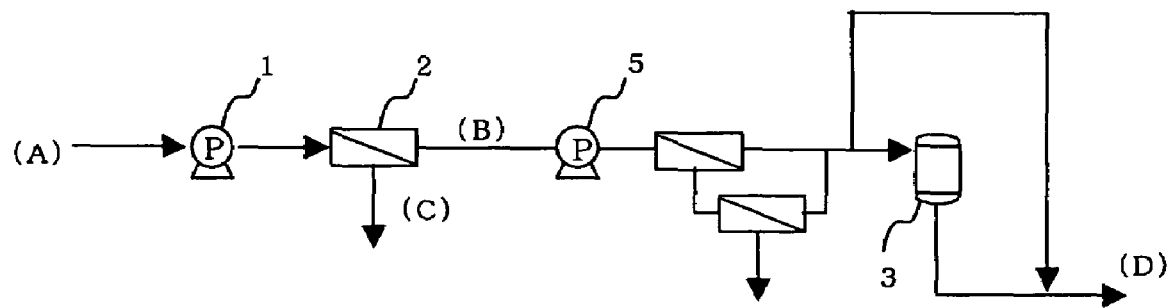
Figure 10:
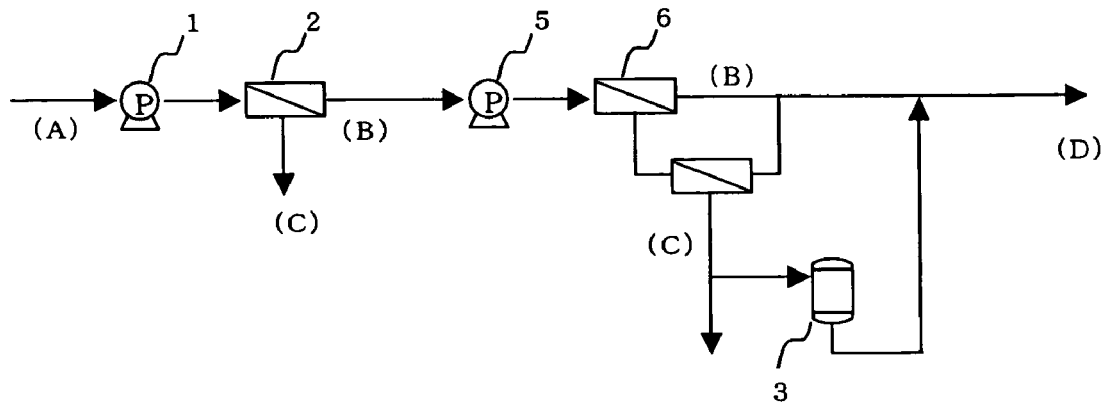
Figure 11:
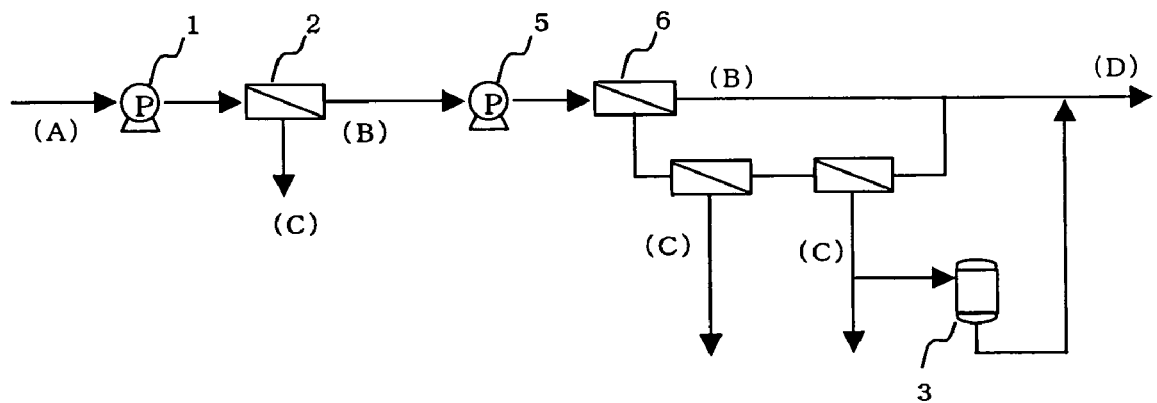
Figure 12:
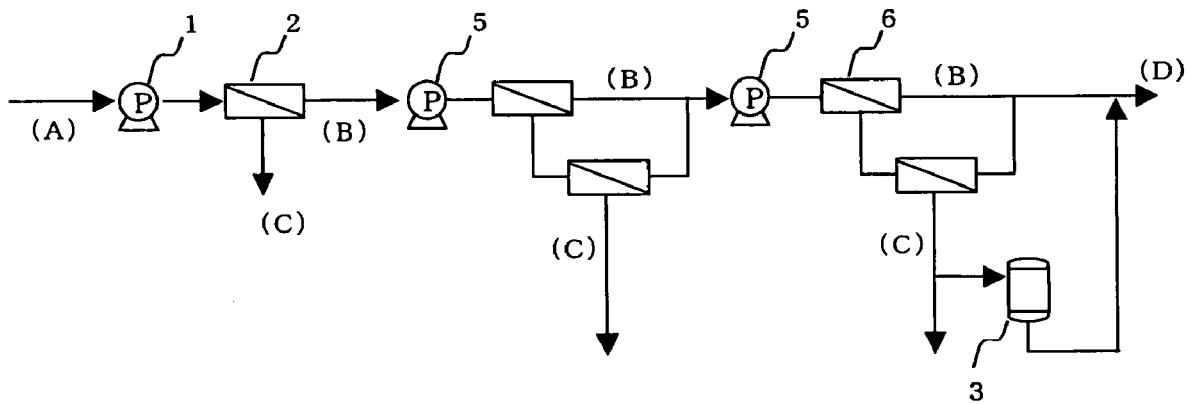
Figure 13:
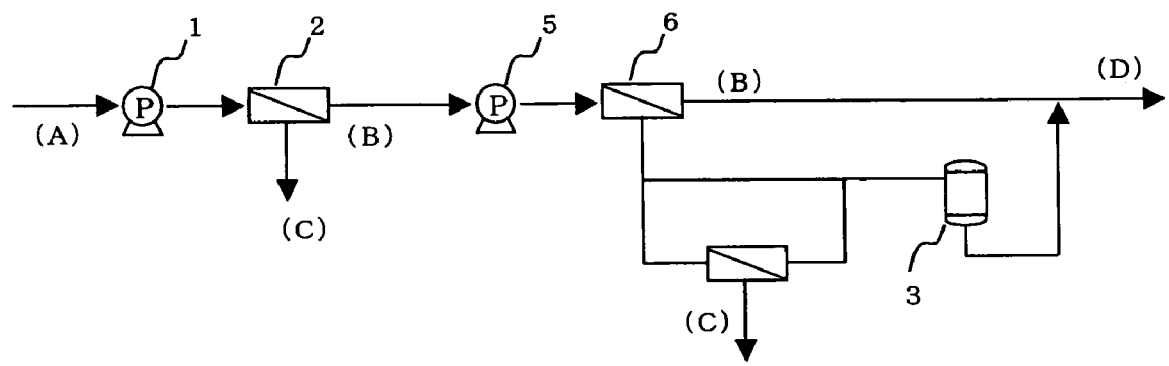
Figure 14:
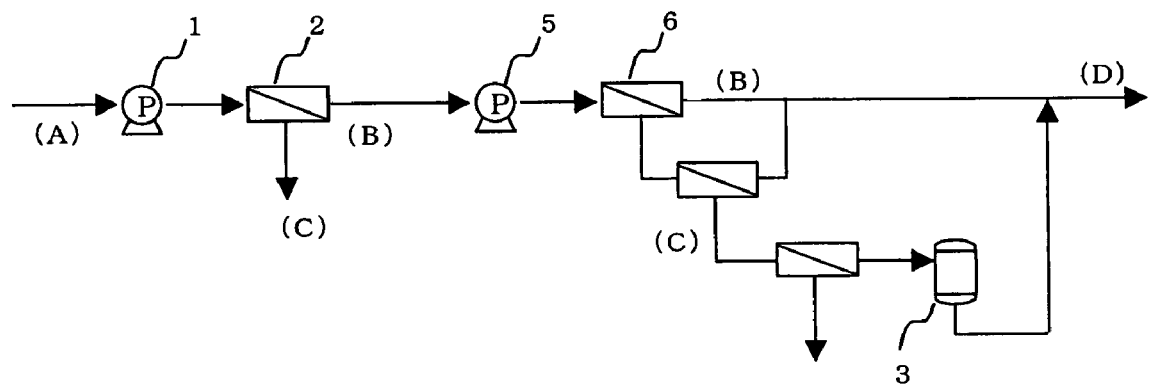

FIG. 5 is a principal schematic diagram of the water processing apparatus in which the second reverse osmosis membrane module is disposed in the bypass line shown in FIG. 2. FIG. 6 is a principal schematic diagram of the water processing apparatus in which the reverse osmosis membrane module shown in FIG. 5 has multiple stages. FIG. 7 is a principal schematic diagram of the water processing apparatus in which the second reverse osmosis membrane module is disposed at a front stage of the boron removal means shown in FIG. 2. FIG. 8 is a principal schematic diagram of the water processing apparatus in which the reverse osmosis membrane module shown in FIG. 7 has multiple stages. FIG. 9 is a principal schematic diagram of the water processing apparatus in which the second reverse osmosis membrane module is disposed in a front stage of the bypass branch point shown in FIG. 2. FIG. 10 is a principal schematic diagram of the water processing apparatus in which the reverse osmosis membrane module shown in FIG. 4 has multiple stages. FIG. 11 is a principal schematic diagram of the water processing apparatus in which the reverse osmosis membrane module shown in FIG. 4 has multiple stages. FIG. 12 is a principal schematic diagram of the water processing apparatus in which the reverse osmosis membrane module is disposed in a front stage of the reverse osmosis membrane module shown in FIG. 4, and the reverse osmosis membrane module shown in FIG. 4 has multiple stages. FIG. 13 is a principal schematic diagram of the water processing apparatus in which the reverse osmosis membrane module shown in FIG. 4 has multiple stages, and a part of the concentrated water is processed at a subsequent stage. FIG. 14 is a principal schematic diagram of the water processing apparatus in which the reverse osmosis membrane module shown in FIG. 4 has multiple stages.

In all Figures, it is preferable that the alkali injection means for adjusting the pH of the water be disposed between the first osmosis membrane module 2 and the second osmosis membrane module 6.

Figure 15:
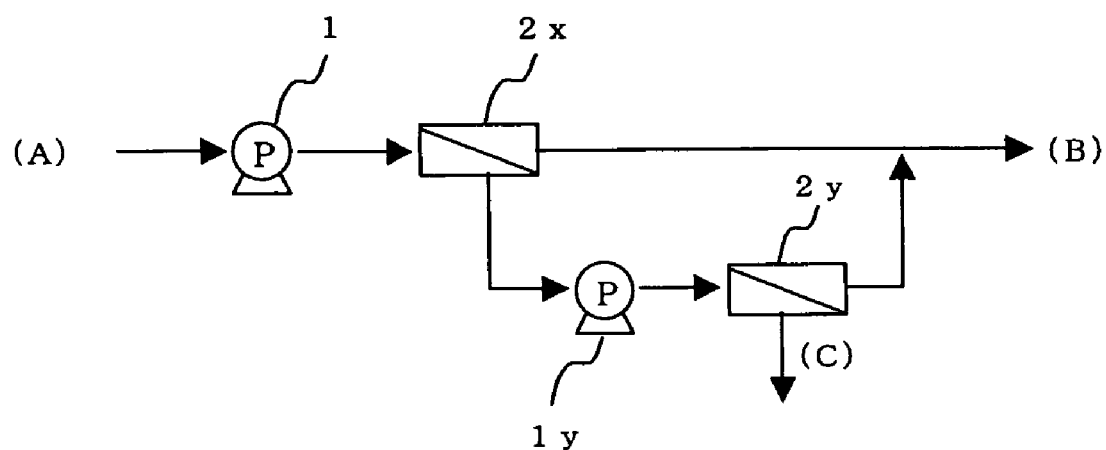
FIG. 15 is a partial diagram of a water processing apparatus having two stages in the reverse osmosis membrane module 2 in FIG. 2.
Figure 16:
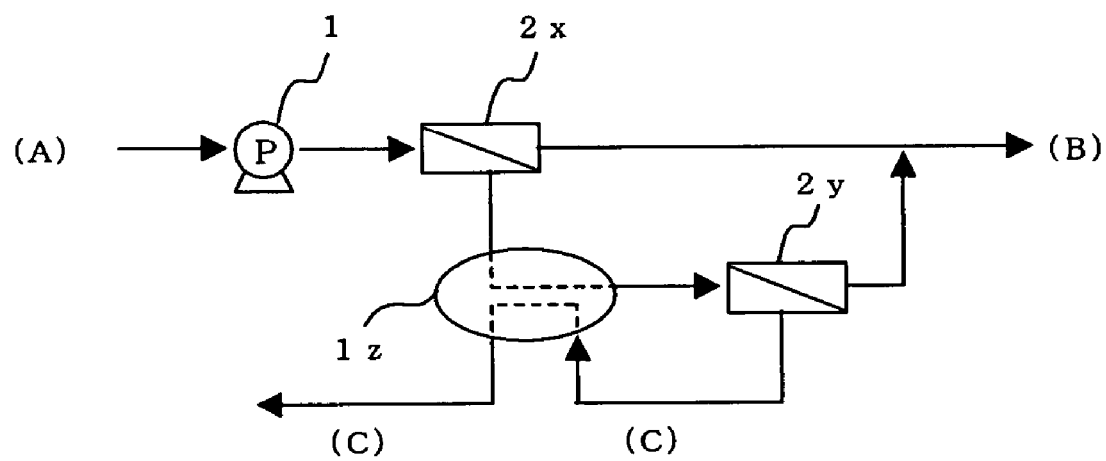
FIG. 16 is a partial diagram of a water processing apparatus having two stages and a non-powered compressor in the reverse osmosis membrane module 2 in FIG. 2.

Each of the reverse osmosis membrane modules 2, 6 shown in FIGS. 2 to 14 may have two-stage configuration as shown in FIG. 15. The concentrated water obtained in the first stage of the reverse osmosis membrane module 2x may be boosted with a pump 1y and then may be fed into the second stage of the reverse osmosis membrane module 2y. The permeated water obtained in the second stage of the reverse osmosis membrane module 2y is merged with the permeated water obtained in the first stage of the reverse osmosis membrane module 2x, thereby enhancing the water processing efficiency. In this case, as shown in FIG. 16, a compressor 1z such as a turbo charger that is operated by recovering energy of the concentrated water discharged from the second stage of the reverse osmosis membrane module 2y is used as the pump for feeding the concentrated water of the first stage into the second stage of the reverse osmosis membrane module 2y, whereby the water processing costs can be decreased.

If the seawater (raw water) fed is preprocessed by a filtration using a membrane such as an MF membrane and a UF membrane, the turbid components in the fed water are decreased and the water can be fed into the reverse osmosis membrane module 2 at higher flow rate. There is no need to use the pump and energy recovery equipment between the first stage and the second stage of the reverse osmosis membrane modules.

In all cases shown in FIGS. 4 to 14, the concentrated water obtained in the second osmosis membrane module is preferably returned back to the fed side on the first osmosis membrane module. The concentrated water obtained in the second osmosis membrane module has good water quality except that the boron concentration is high, and is returned back to the fed side for recycling, whereby the water processing costs can be decreased.

Figure 17:
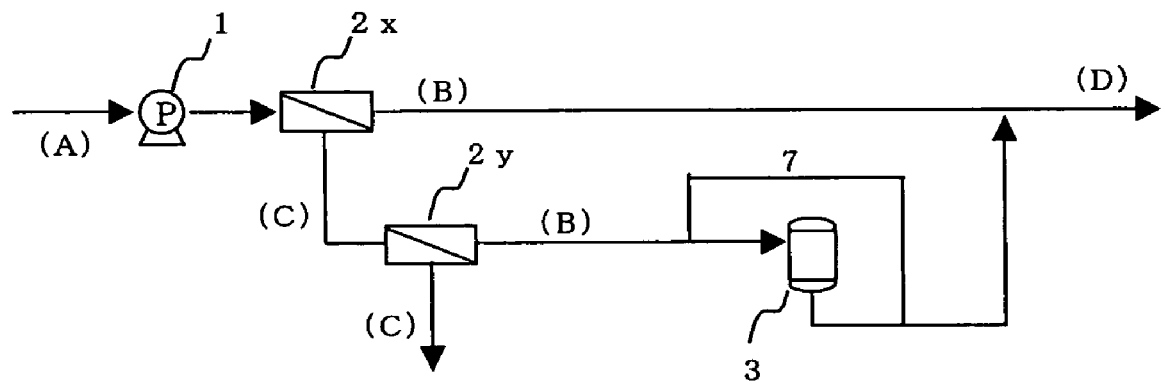

FIG. 17 shows a principal schematic diagram of the water processing apparatuses according to another embodiment of the present invention. In this embodiment, the first reverse osmosis membrane module 2 has a two-stage configuration, and the concentrated water side on the first stage of the reverse osmosis membrane module 2x is connected to the second stage of the reverse osmosis membrane module 2y. At a downstream of the permeated water side on the second stage of the reverse osmosis membrane module 2y, the boron removal means 3 and the bypass line 7 as the watercourse not passing through the boron removal means 3 are disposed in parallel. The water passed through the boron removal means 3 is mixed with the water not passed through the boron removal means 3.

Figure 18:
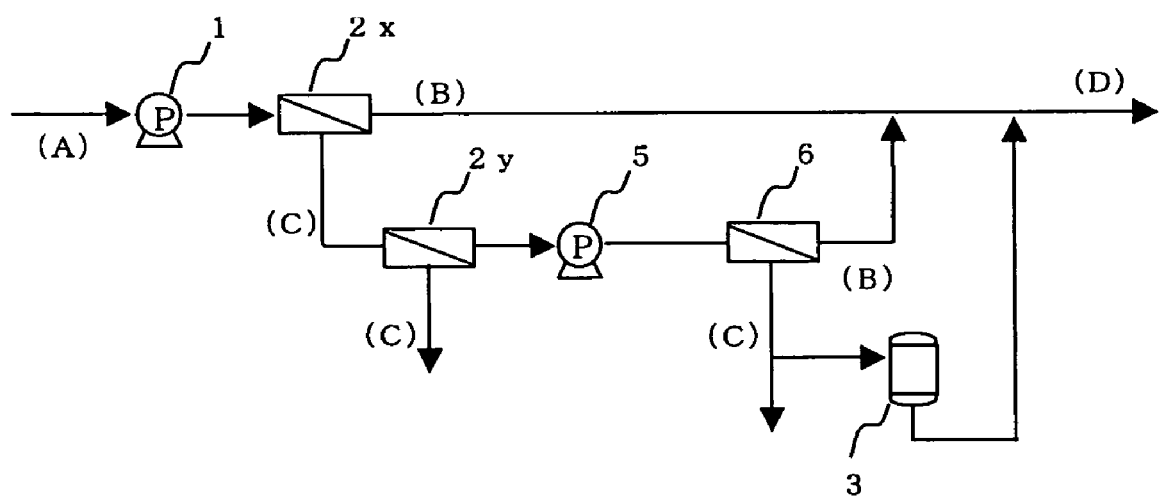

FIG. 18 shows a principal schematic diagram of the water processing apparatuses according to another embodiment of the present invention. In this embodiment, the first reverse osmosis membrane module 2 has a two-stage configuration, and the concentrated water side on the first stage of the reverse osmosis membrane module 2x is connected to the second stage of the reverse osmosis membrane module 2y. At a downstream of the permeated water side on the second stage of the reverse osmosis membrane module 2y, the low pressure pump 5 (booster) and the second reverse osmosis membrane module 6 are disposed. The permeated water from the second stage of the reverse osmosis membrane module 2y is further separated into the concentrated water and the permeated water in the second reverse osmosis membrane module 6. At a downstream of the concentrated water side on the reverse osmosis membrane module 6, the boron removal means 3 is disposed. The boron is removed from at least a part of the concentrated water obtained in the reverse osmosis membrane module 6. The concentrated water containing no boron in the reverse osmosis membrane module 6 is mixed with the permeated water from the reverse osmosis membrane module 2x and the permeated water from the reverse osmosis membrane module 6.

Figure 19:
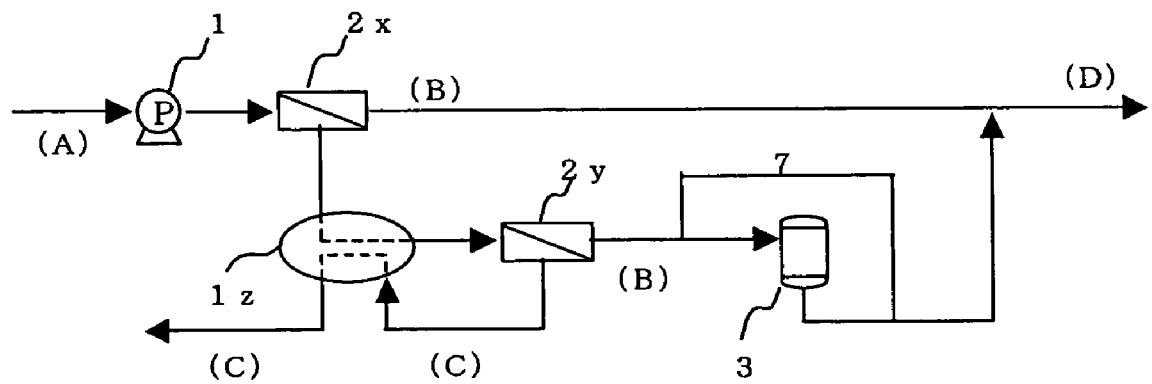
Figure 20:
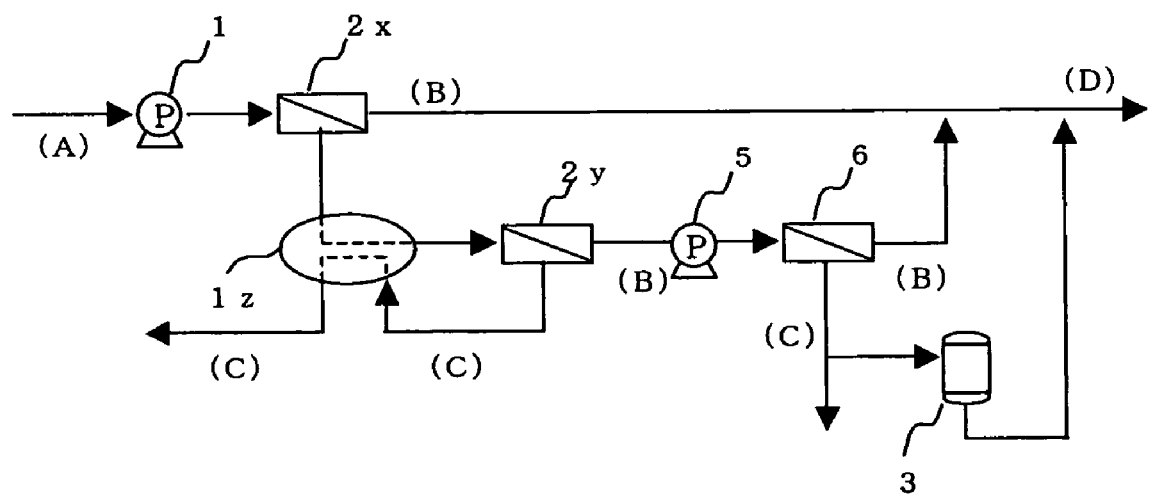

As shown in FIGS. 19 and 20, the compressor 1z such as the turbo charger that is operated by recovering energy of the concentrated water discharged from the second stage of the reverse osmosis membrane module 2y is used as the pump shown in FIGS. 17 and 18, whereby the water processing costs can be decreased.

EXAMPLE 1

As a preprocessing, seawater having a salt concentration of 35,700 mg/L and a boron concentration of 5 mg/L is adjusted to be pH 6.5 at 25° C., and then filtrated with a hollow yarn ultrafiltration membrane module. Then, the preprocessed water is introduced into the apparatus shown in FIG. 2, is boosted with the high pressure pump 1 to a pressure of 5.5 MPa, and is fed into the reverse osmosis membrane module 2. In the reverse osmosis membrane module 2, the water processing efficiency is to be 40%. In other words, the amount of the permeated water in the reverse osmosis membrane module 2 is to be 40, when the amount of fed water is set to 100.

Hereinafter, the amount of the water in percentage is noted in parenthesis when the amount of the fed water after the preprocessing is set to 100.

The permeated water (40) of the reverse osmosis membrane module 2 has a TDS (total dissolved solids) concentration of 150 mg/L and a boron concentration of 1.2 mg/L. On the other hand, the concentrated water (60) of the reverse osmosis membrane module 2 has a TDS concentration of 60,600 mg/L and a boron concentration of 8 mg/L. 40% of the water (16) in the permeated water from the reverse osmosis membrane module 2 is flowed through the bypass line 7. The remaining 60% of the water (24) is flowed through an adsorbing tower 3 in which the chelate resin is filled to remove the boron. The amount of the water passed through the adsorbing tower is (23) with the water for recycling the resin is excluded. The water has a boron concentration of 0.05 mg/L after the water is passed through the adsorbing tower. The water has a TDS concentration of 150 mg/L which is the same value before the water is passed through the adsorbing tower, since the TDS is not removed with the chelate resin. Then, the water (23) processed at the adsorbing tower 3 is mixed with the water (16) passed through the bypass line 7 to provide the mixed water (39). The mixed water has a TDS concentration of 150 mg/L and a boron concentration of 0.5 mg/L. The water processing efficiency after passing through the reverse osmosis membrane module 2 is 98%.

COMPARATIVE EXAMPLE 1

In contrast to the EXAMPLE 1 described above, when the total amount of the permeated water (40) in the reverse osmosis membrane module 2 is passed through the adsorbing tower 3 without the bypass line 7, the water processing efficiency after passing through the reverse osmosis membrane module 2 is decreased as low as 96%. The boron concentration becomes 0.05 mg/L, and thus the boron is excessively removed. Accordingly, it is required to increase the amount of the resin for filling the adsorbing tower as compared with EXAMPLE 1.

The amount of the resin in EXAMPLE 1 is compared with that in COMPARATIVE EXAMPLE 1. When the amount of the resin in the adsorbing tower in COMPARATIVE EXAMPLE 1 is taken as 100, the amount of the resin in the adsorbing tower in EXAMPLE 1 is as low as 60. In other words, the amount of the resin in the adsorbing tower can be decreased by 40% according to the water processing method and the apparatus of the present invention. Initial costs of the apparatus and the water processing costs can be decreased at low level.

EXAMPLE 2

The water that is preprocessed as in EXAMPLE 1 is introduced into the apparatus shown in FIG. 4. The preprocessed water is boosted with the high pressure pump 1 to a pressure of 5.5 MPa, and is fed into the first reverse osmosis membrane module 2. In the first reverse osmosis membrane module 2, the water processing efficiency is to be 40%. In other words, the amount of the permeated water in the reverse osmosis membrane module 2 is to be 40, when the amount of fed water is set to 100.

The membrane used in the first reverse osmosis membrane module 2 has salt rejection of 99.6% or more when a saline solution having a concentration of 35,700 mg/L at 25° C., pH of 6.5, is provided at 5.5 MPa.

As in EXAMPLE 1, the permeated water (40) of the first reverse osmosis membrane module 2 has a TDS (total dissolved solids) concentration of 150 mg/L and a boron concentration of 1.2 mg/L. The concentrated water (60) of the first reverse osmosis membrane module 2 has a TDS concentration of 60,600 mg/L and a boron concentration of 8 mg/L.

The permeated water (40) obtained in the first reverse osmosis membrane module 2 is adjusted to have a pH of 10 using an alkali injection means, and is fed to the second reverse osmosis with the low pressure pump 5. In the second reverse osmosis membrane module 6, the water processing efficiency is set to be 90%. A pressure of the low pressure pump is set to 1 MPa.

The membrane used in the second reverse osmosis membrane module 6 has flux of 0.8 $m^3/m^2 \cdot day$ or more when a saline solution having a concentration of 1500 mg/L at 25° C. and pH 6.5 is fed at 1.5 MPa.

The permeated water (36) of the second reverse osmosis membrane module 6 has a TDS concentration of 3 mg/L and a boron concentration of 0.24 mg/L. The concentrated water (4) has a TDS concentration of 1,100 mg/L and a boron concentration of 8 mg/L. The concentrated water (4) is flowed through the adsorbing tower 3 in which the chelate resin is filled to remove the boron. The amount of the water passed through the adsorbing tower is (3.8) with the water for recycling the resin is excluded. After the boron removal, the water has a TDS concentration of 1,100 mg/L and a boron concentration of 0.05 mg/L. Then, the water (3.8) processed at the adsorbing tower 3 is mixed with the permeated water (36) of the second reverse osmosis membrane module 6 to provide the mixed water (39.8). The mixed water has a TDS concentration of 150 mg/L and a boron concentration of 0.23 mg/L. The water processing efficiency after passing through the second reverse osmosis membrane module 6 reaches 99.5%.

The "palatable water" for the potable water preferably contain a reasonable amount (30 to 200 mg/L) of minerals such as calcium and magnesium. The mixed water obtained in EXAMPLE 2 has a TDS concentration of 150 mg/L, contains a reasonable amount of calcium and magnesium, and therefore is suitable for the potable water.

The amount of the resin in the adsorbing tower 3 could be very low since the resin is for the concentrated water (4) from the second reverse osmosis membrane module 6.

COMPARATIVE EXAMPLE 2

In contrast to the EXAMPLE 2, when the boron removal means 3 is not disposed ad the concentrated water side on the second reverse osmosis membrane module 2 and the concentrated water is discharged, the water processing efficiency after passing through the second reverse osmosis membrane module 6 becomes 90%. The amount of the water processed is (36) based on the amount of the water fed (100) after the preprocessing. In order to provide the equivalent amount of the water containing no boron, the amount of the water fed after the preprocessing is to be (111), which requires extra costs for the preprocessing and costs regarding the first reverse osmosis membrane module. Furthermore, it requires electric power costs, resulting in the increased water processing costs.

As to the water quality, a TDS concentration is 3 mg/L and a boron concentration is 0.24 mg/L. The water does not contain the adequate amount (30 to 200 mg/L) of minerals, and cannot be defined as palatable.

INDUSTRIAL APPLICABILITY

Thus, a part of the permeated water obtained by separating the boron-containing water at the reverse osmosis membrane module is subjected to the boron removal, and the permeated water that is subjected to the boron removal is mixed with the permeated water that is not subjected to the boron removal, so that the boron is not removed from the raw water than necessary. Therefore, the boron removal means can be efficiently utilized, and equipment costs and operation costs can be decreased. The economics of the water processing can be improved.

In addition, at least two reverse osmosis membrane modules are used, the boron-containing water is processed at the first reverse osmosis membrane module to separate it into the concentrated water and the permeated water, at least a part of the permeated water obtained is adjusted to have a pH that is suitable for the boron removal and is processed at the second reverse osmosis membrane module to separate it into the concentrated water and the permeated water, and at least a part of the concentrated water obtained in the second reverse osmosis membrane module is subjected to the boron removal. The efficiency can be further enhanced and the economical properties can be improved.

Depending on the water quality of the permeated water at the reverse osmosis membrane module, when a flow rate of the permeated water passing through the boron removal to the permeated water passing through the bypass means is controlled, the processed water with continuously a stable boron concentration can be obtained even if the water quality of the raw water, i.e., seawater is changed depending on a temperature change. Needless to say, in this case, the boron concentration of the mixed water should be kept at the predetermined water quality standard or less. Thus, the boron removal means can be still further efficiently utilized. The operation costs, the water processing costs, and the economics can be further decreased.

The adsorbent that adsorbs the boron selectively is used, whereby only the boron is removed from the water, and the minerals are not removed therefrom. Accordingly, the palatable water adequately containing minerals can be obtained.

The invention claimed is:

1. A water processing method comprising the steps of:
separating boron-containing water using at least two reverse osmosis membrane modules to provide a permeated water, wherein at least a part of the permeated water obtained in a first reverse osmosis membrane module is subjected to processing with a second reverse osmosis membrane module to produce a second permeated, water and a boron concentrated water, and
subjecting at least a part of the concentrated water obtained in the second reverse osmosis membrane module to boron removal using an adsorbent, wherein the water subjected to the boron removal is mixed with the second permeated water not subjected to the boron removal to provide a mixed water,
wherein the water processing efficiency in the second reverse osmosis membrane module is equal to or greater than 90%,
wherein the first reverse osmosis membrane module uses a reverse osmosis membrane having salt rejection of 90% or more when a saline solution having a concentration of 35,700 mg/L at 25° C. pH of 6.5 is provided at 5.5 MPa. and wherein the second reverse osmosis membrane module uses a reverse osmosis membrane having flux of 0.8 m$^3$/m$^2$day or more when a saline solution having a concentration of 1500 mg/L at 25° C., pH of 6.5 is provided at 1.5 Mpa, and
wherein a pH of water introduced to the second reverse osmosis membrane is 9 or more.

2. A water processing method according to claim 1, wherein a flow ratio of the water subjected to the boron removal to the water not subjected to the boron removal is controlled to provide mixed water with desired water quality.

3. A water processing method according to claim 1, wherein untreated water having a boron concentration of 3 mg/L or more is processed.

4. The water processing method of claim 1, wherein the initial boron concentration of the feed water subjected to boron removal using an adsorbent is higher than the boron concentration of the water introduced to the first reverse osmosis membrane.

* * * * *